(12) United States Patent
Cordova

(10) Patent No.: US 6,387,169 B1
(45) Date of Patent: May 14, 2002

(54) GUAR GUM BASED FLOWING GEL PLAY COMPOSITION

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/502,508

(22) Filed: Feb. 11, 2000

(51) Int. Cl.[7] .................................................. C08L 5/00
(52) U.S. Cl. ............................. 106/205.3; 106/205.31; 106/205.71; 106/205.72; 106/205.01
(58) Field of Search .................... 106/205.3, 205.31, 106/205.71, 205.72, 205.01

(56) References Cited

U.S. PATENT DOCUMENTS

| | | | | |
|---|---|---|---|---|
| 3,384,498 A | * | 5/1968 | Ahrabi ....................... 106/38.5 |
| 4,735,660 A | * | 4/1988 | Cane ........................... 106/203 |
| 5,258,068 A | | 11/1993 | Shapero et al. ............. 106/208 |
| 5,271,466 A | * | 12/1993 | Harms ........................ 166/300 |
| 5,308,546 A | | 5/1994 | Hansen et al. .............. 252/301 |
| 5,322,123 A | * | 6/1994 | Kohler et al. ............... 166/295 |
| 5,498,645 A | * | 3/1996 | Mariano et al. ............ 523/218 |

* cited by examiner

Primary Examiner—David Brunsman
(74) Attorney, Agent, or Firm—Robert W. Mulcahy

(57) ABSTRACT

The invention is directed to a pliable play gel composition comprised of certain guar gums, a cross-linking agent, and water in certain amounts to form a composition having exceptional gel cohesiveness and rheology resulting in a free flowing play gel exhibiting a novel texture and tactile feel character. The nature of the instant play gel enables the use of the guar based gel in a host of play patterns for children or adults which exploit its free flowing and pleasantly comfortable tactile feel characteristics.

17 Claims, No Drawings

GUAR GUM BASED FLOWING GEL PLAY COMPOSITION

TECHNICAL FIELD OF THE INVENTION

The present invention relates to a pliable composition of matter for use as a malleable play material and, more particularly, to guar based toy gel compositions having sufficient cohesiveness which enables a high flow rheology and pleasurable tactile feel and texture character in the gel.

BACKGROUND OF THE INVENTION

Through the years, play compositions of different types have been provided by practitioners in the toy arts to amuse children and adults and to aid in the development of manual skills and dexterity, as well as creativity. While the variety of such play material compositions is virtually endless, all generally involve the use of free-forming or malleable materials, such as oil base or water base gums and gel compounds which may be manipulated and shaped by the user. Certain materials have been provided which are moldable and tend to retain their shapes, such as modeling clay or the like. Others, however, have been provided which are looser and more free-flowing, such as novelty play materials and compositions. Still others are gel-like and provide interesting characteristics, such as shaking or quivering similar to gelatin dessert products.

Regardless of the type of play compositions used, it has remained imperative that such materials be safe for young children. Safety requirements have evolved through the years as safety concerns have grown. Generally, safety requirements mandate that play material compositions be nonirritating to the skin or eyes or the like, and be nontoxic if ingested. Additional requirements have been expected of these materials to avoid damage to clothing, upholstery fabric, or carpeting. In particular, polysaccharide and natural gum based play compositions are known in the art as being child-user friendly. Specifically, guar gums and starches have been widely used in toy products because they have been found to be harmless if accidentally ingested, has no unpleasant odor or feel, and is readily removable from carpet or fabrics.

The present invention is directed to a guar gum based toy gel material. Gel compositions are aqueous compositions thickened with gums, starches, resins or fine silica. The rheology of the composition may vary widely depending on the thickening binder agent used and the additives present. In this regard there has been considerable effort expended to produce pliable play materials having the desired feel or tactile characteristics. Accordingly, the smoothness or softness texture as well as the tendency for play materials to be either sticky or slippery in some degree has all received substantial attention by practitioners in the art in endeavoring to obtain an interesting and amusing feel to play gel compositions. Specifically, there is significant interest in providing a play gel material that is malleable, pliable, free flowing and have a satisfactory tactile feel; that can be used for long periods of time without drying to the point that it becomes unusable; that would not be harmful if accidentally ingested; and that exhibits a bright, shiny colorful appearance with no unpleasant odor. It was further sought to have a play material which can be cleaned up and removed from carpets and fabrics with water. It was also important to produce a composition exhibiting all of the above properties while being moderate in cost.

SUMMARY OF THE INVENTION

The discovery of the present invention is that one may formulate a superior play gel composition by combining a binder comprised of a certain guar gum selected from the group of hydroxypropyl guar (HPG), carboxymethyl guar (CMG) and carboxymethyl hydroxypropyl guar (Carboxymethyl 2-Hydroxypropyl Ether) (CMHPG), a cross-linking agent (gellant), and water in certain amounts to form a composition of completely unexpected character in that it possesses exceptional gel cohesiveness and rheology resulting in a free flowing sticky play gel having a novel texture and tactile feel character. The nature of the instant play gel enables the use of the guar based gel in a host of play patterns for children or adults which exploit its free flowing and tactile feel characteristics.

In accordance with the present invention, there is provided a playable, cohesive non-toxic, toy gel composition which has a stretchable, slimy consistency and tactile feel characteristic. The gel has a healable property so that if pulled apart, upon manipulation it will re-adhere. The composition is formulated of a heavily thickened aqueous solution which is gelled with a migrating, rehealable crosslinking agent to provide a thick, soft consistency which can be stretched and hand manipulated in the nature of a "blob" of cohesive gelatin. The formulation provides colorants and dyes to be dissolved in the composition to generate coloring to the play gel.

One property of the invention provides a rheology which allows the composition to be formed into hand or matrix molded shapes and to be integrally free flowing between fingers or down inclines. Another property of the gel is its cohesive nature which allows it to be stretched into long strands or stretched into thin membranes without breaking. A still further property of the instant play gel is its unexpected ability to conduct electricity, indicating an ionic mobility characteristic of the gel.

The toy gel composition's consistency is provided by a certain guar gum thickening or binding agent in an aqueous solution crosslinked with a borate or zirconium ion based crosslinking agent. The guar compositions of the invention are selected from the group comprising hydroxypropyl guar (HPG), carboxymethyl guar (CMG) and carboxymethyl hydroxypropyl guar (Carboxymethyl 2-Hydroxypropyl Ether) (CMHPG). The crosslinking borate is provided by a borate salt, boric acid, or a mixture thereof while the zirconium ion is provided by appropriate salts such as zirconium lactate. Optimum gel consistency is obtained with an aqueous solution at a pH of about 6.0 to 8.7 and having from about 0.5 to 3.0 weight percent of the guar binder and from about 0.1 to 2.0 weight percent of a borate or zirconium ion provider.

In one preferred form, a cohesive play gel composition is comprised of (i) at least 90% by weight of an aqueous portion; (ii) at least 0.5 weight percent of a guar gum selected for the group comprising hydroxypropyl guar (HPG), carboxymethyl guar (CMG) and carboxymethyl hydroxypropyl guar (Carboxymethyl 2-Hydroxypropyl Ether) (CMHPG) and (iii) at least 0.5% by weight of a borate ion cross-linking agent. The composition further includes appropriate small amounts of preservatives, humectants, plasticizers, and colorants.

The present toy play gel composition is prepared by:

a) mixing a guar gum polymer selected from the group of guar gums comprising hydroxypropyl guar (HPG), carboxymethyl guar (CMG) and carboxymethyl hydroxypropyl guar (Carboxymethyl 2-Hydroxypropyl Ether) (CMHPG) and water at an elevated temperature, to form a solution; and b) adding sufficient amounts of a cross-linking agent to the solution, and mixing until a firm pliable gel compound is formed.

DETAILED DESCRIPTION OF THE INVENTION

The cohesive gel composition of the present invention recognizes the creation of a play material having flow properties and an unusual tactile feel utilizing a combination of large quantities of water and small quantities both of a certain malleable binder (or thickener) and crosslinking agent. The combined readily gelatinizable and adhesive character of the binder together with a reactive crosslinking agent captures and suspends the large water volume resulting in the creation of a different play material which while maintaining an integral mass behaves much like a free flowing amorphous "blob" which easily tears, packs, and recombines and will blanket coat any surface to which is applied. In a preferred embodiment, the binder and the crosslinking agent are present in sufficient quantity to prevent the large water volume from escaping the suspension as loose fluid thereby ensuring the integrity and cohesiveness of the total gel mass. Put another way, there is sufficient thickener (binder) present in the aqueous mixture to loosely hold the water and allow the play gel composition to be pliable and free flowing and yet preserve the integral nature of a solid amorphous mass to facilitate play patterns typical of such play gels.

The present cohesive pliable play gel composition is provided for the entertainment of children or adults. The unusually tactile and free flowing, yet pliable and manipulatable consistency or the invention is obtained in a water-based composition thickened by a certain guar gum and crosslinked by with a borate ion. The relatively low amount of the crosslinked guar gum, from about 0.1 to 2wt %, provides the cohesive gelled consistency approaching that of a soft, sticky amophous gelatin. The gels of the instant invention have a specific gravity range of from about 1.10 to 1.30.

The instant play gel composition is the combination of several ingredients which synergistically provide for the desirable properties of the instant gel invention recited above. As indicated, the binder used herein is a guar gum. Specifically, it is contemplated that an exemplary composition contains a certain guar binder selected from the group of guar gums comprising hydroxypropyl guar (HPG), carboxymethyl guar (CMG) and carboxymethyl hydroxypropyl guar (Carboxymethyl 2-Hydroxypropyl Ether) (CMHPG). It has been determined that the particular guar gums herein in combination with borate or zirconium thickening agents form the instant cohesive amorphous gels which are usable as play gel items.

Guar gums are known thickening agents used in various industries for numerous applications and are produced by grinding guar beans into a fine powder. Modifications to these basic guar powders improve their properties for hydration in solutions containing other ingredients such as gylcols. Other modifications can be made which change the rate of hydration in aqueous solutions. The modified guars of the present invention are those selected from the group of hydroxypropyl guar (HPG), carboxymethyl guar (CMG) and carboxymethyl hydroxypropyl guar (Carboxymethyl 2-Hydroxypropyl Ether) (CMHPG) all of which have been found to have stability and provided adequate viscosity in borate ion crosslinked gels. Particularly preferred modified guar gums are hydroxypropyl substituted guars such as hydroxypropyl guar (HPG) and carboxymethyl hydroxypropyl guar (Carboxymethyl 2-Hydroxypropyl Ether) (CMHPG). The guar gums disclosed herein are used in amounts of from about 0.5 to 2.0 wt % in the cohesive play gels of the present invention.

It will be appreciated by those skilled in the art that several borate or zirconium based salts will satisfy the requirements of the present invention. By way example and not limitation, sodium borate, sodium tetraborate, disodium tetraborate, potassium borate, potassium tetraborate, or combinations thereof will provide or assist in providing the borate ion. Zirconium salts, such as zirconium lactate, potassium zirconium carbonate, and (2-)bis[carbonate(2-)-O]dihydroxy-diammonium zirconate are also effective. Borate salts in the form of sodium borate or sodium tetraborate (borax) are preferred in the present process for preparing the instant play gels. These borate salts or boric acid, or a combination of these, are provided in percentages of from 0.1 to about 1.0 weight percent to supply the borate ion for crosslinking the guar gum and providing a pH in an acceptable range of from about 6.0 to about 8.7. A more preferred range would be a pH in the range of from about 7.0 to about 8.3.

Boric acid and borate salts provide a migrating, rehealable cross link to guar- thickened gels which is very pH sensitive. Lower pH's cause the gel mixture (suspension) to be sticky, and higher pH's cause the mixture to be rubbery and resistant to rehealing. Other products in the formulation and variations thereof affect the pH of the final mixture differently and adjustment must be made in the borax and/or boric acid to maintain the pH at about 7.5. It will be appreciated that a mild base combined with boric acid may also be used to formulate a composition with a pH within the optimum range. Borate compound concentrations of less than 0. 1% are adequate for cross-linking, but more favorable buffering which renders the mixture more stable is obtained with the concentration of borate higher and closer to 1%.

Preservatives and dispersing agents can be used in the instant cohesive play gel guar composition in amounts of up to 3% by weight. Propylene glycol is used as a plasticizer and heat stabilizing agent in the instant composition but can also function as a preservative and dispersing agent for fluidizing guar gums. The guar gum partially hydrates in propylene glycol and, therefore, disperses evenly. The combination is easily stirred into the water-based solution without lumping. Propylene glycol is an ingredient used in many foods such as extracts and salads dressings, therefore posing no toxicity hazard to children. Other preservatives equally as effective include methyl, ethyl, benzyl, butyl, and propyl parabens (p-hydroxy benzoate), and sodium benzoate, all used in food products. Many other commercially available preservatives well known to those skilled in the art may be used.

A suitable pigment or dye is preferably employed in the present cohesive play gel composition to enhance its entertainment or play effect. Without the pigment or dye, the composition is basically translucent, while with up to 6% by weight of a suitable pigment or dye the play material can be made to take on an array of vivid colors which are magnified by the stretch and membrane forming characteristics of the guar gum gel composition. Typical pigments and colorants include synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; tetra-chlorozincate sold by the Day Glow Corporation: and. FD&C Powder Series colorants sold and distributed by Warner & Jenkinson.

The instant play material contemplates using an amount of water in excess of 90% by weight to achieve a pleasant tactile feel and free flow of the cohesive play gel material of the instant invention. Water content below the 90% minimum renders the composition too dry with loss of stretchability and tactile feel, while water in excess of 98% renders the material disparate, liquid and gooey. Equally important is the amount of cross-linking agent and thickener to help maintain a high water level to sustain the unique cohesiveness which generates the pleasant tactile sensation and free flowing characteristics of the present play gel composition. The stretch, or elongation, properties of the instant gel are enhanced by the addition of plasticizers such as glycerine or glycerol and by the particular crosslinking agents employed in the preparation of the gel.

It is important that the instant guar gum based composition remain pleasantly comfortable to the touch and free flowing throughout its effective life. To achieve this goal, humectants are added to prevent the loss of water to any extent so the user may reconstitute the mass to is original character merely by wetting ones hands. High levels of humectant make the mass receptive to the addition of a small amount of water lost during play while retaining the essential non-drying character of the composition. It is imperative that the amount of water lost during play use or storage be insignificant in comparison to any negative effect the amount of humectant has upon the composition. Humectants frequently employed in malleable play compositions include glycerine, polyglycols including glycerol, and/or polypropylene glycol. The humectants employed herein equally function as plastercizers thereby promoting elongation (stretch) of the gum based gel and may be used in quantities as need to achieved the desired results.

It will be recognized by those skilled in the art that a substantial number of play material compounds may be employed to provide the crosslinking agent portion of the present play gel material. The important characteristics of the crosslinking agent is that it provide a migrating, rehealable crosslink to the instant family of guar gums selected from the group of hydroxypropyl guar (HPG), carboxymethyl guar (CMG) and carboxymethyl hydroxypropyl guar (Carboxymethyl 2-Hydroxypropyl Ether) (CMHPG). In the preferred embodiments of the present invention, the proportionate parts of the instant pliable play gel material are as follows:

TABLE I

| Ingredient | Percent by Weight | |
| --- | --- | --- |
| Water | 90.00–98.00 | |
| Cross-Linking Agent | 0.10–1.00 | |
| Colorant | 0.0005–1.00 | (as needed) |
| Preservative | 0.10–1.00 | |
| Binder (Thickener) | 0.5–2.00 | |
| Plasticizer (Humectant) | As needed | |
| Fragrance | As needed | |

As indicated, a preferred embodiment of the present invention adds a fragrance material as needed. The fragrance material is added solely to enhance the fragrance of the formulation and no maximum or minimum weight of fragrance material is set forth in Table I.

Table II sets forth an exemplary embodiment of the present play gel material

TABLE II

| Ingredient | Percent by Weight |
| --- | --- |
| Deionized Water | 97.5% |
| Borax (disodium tetraborate) | 0.7% |
| Pigment (FD&C Blue #1) | 0.0007% |
| Preservative (P-Hydroxy-benzoate) | 0.8% |
| Binder (Thickener-CMHPG) | 0.8% |
| Fragrances | as needed |
| Humectant (Glycerol) | as needed |

It should be appreciated from the detail of Table II that the water, crosslinking agent, and the guar gum binder, or thickener, are the only essential elements to achieve instant play gel having the cited flow and novel texture and tactile feel characteristics necessary to the instant composition invention. Also shown in Table II are pigment and humectant additives and an ingredient referred to as "fragrance" all of which are generally present in preferred fabrications of the instant play gel composition but are not necessary items to achieve the advantageous gel characteristics. Of course, the percentages of these main ingredients will change as fragrances, humectants, or plasicizers are added or increased. It will be recognized by those skilled in the art that the colorant and fragrance ingredients may be varied or omitted without departing from the spirit and scope of the present invention.

More specifically and with reference to Table II, the binder (or thickener) portion of the present invention is comprised of a guar gum selected from the group of hydroxypropyl guar (HPG), carboxymethyl guar (CMG) and carboxymethyl hydroxypropyl guar (Carboxymethyl 2-Hydroxypropyl Ether) (CMHPG) and is present in a compositional range of from about 0.50 to 3.00 weight percent of the total composition. It is to be appreciated the binder portion of the formulation may include a soluble cellulose additive such as Klucel HF (water soluble hydroxypropyl cellulose) manufactured by the Aqualon Company present in amounts of up to 2.5 weight percent. Other cellulose binder additives include hydroxy-methyl cellulose sold by Dow Corning under the trademark "Methocel", hydroxy-benzo cellulose sold as "Benzozel" by Aqualon Co., and hydroxy-propyl-methyl cellulose sold as "Prima Flow" by the Hercules Chemical Co.

Additionally optionally present in the Table II composition is propylene glycol which serves as a humectant, preservative, and plasticizer, particularly effective with cellulose binder additives. Deionized water is present at slightly less than 98% and is acceptable in percentages of between about 90% to 98% by weight of the total composition. Sodium tetraborate is the crosslinking agent used at less than 1% but as indicated above can be used in concentrations of from about 0.10 to 2.0%. Phenonip, a preservative, is used at less than one percent with an acceptable level of up to 1% and is effective due to the product's high level of a mixture of alkyl p-hydoxybenzoates.

The instant invention includes a process for producing the composition, which process is set forth in the flow diagram of Table II. Initially, the basic material is formed of a specific guar gum which is dissolved in water to form a liquid solution. Since the purpose of this invention is to make a cohesive flowing gel with a satisfactory tactile-feel, a certain amount of water must be used in combination with a certain amount of cross-linking agent and binder-thickener so as to ensure the necessary gel rheology and texture. Specifically, the process begins with the slow addition, with agitation, of carboxymethyl hydroxypropyl guar (Carboxymethyl 2-Hydroxypropyl Ether) (CMHPG) into a measured amount of distilled water, Phenonip and colorant generally at room temperature or cooler, all contained in a "Cowles" mixer main tank. After the addition of the CMHPG guar gum and mixing, the temperature of the aqueous solution is raised to between 110° F. to 120° F. and held in that temperature range for approximately five minutes with complete mixing for the purpose of eliminating any possible microbiological bacteria or any possible contamination of the CMHPG.

In a separate turbine homogenizer container, suitable quantities of tetraborate decahydrate (Borax) and water are premixed and heated between 160° F. and 180° F. Once the solution reaches the desired temperature and the Borax completely dissolved, it is added slowly to the guar gum solution prepared in the main tank mixer and mixed until the formulation becomes a uniform, hydroscopic, viscous gel.

Table III sets forth a flow diagram of the manufacturing process of the instant play gel composition. Initially, at steps 1 and 2, a pair of premixes are formed which are then combined at step 3 after which the guar gum based composition is completed to provide the play gel composition of the present invention. More specifically, at step 1, a first premix is formed by charging a turbine mixing tank with 95% of the required de-ionized water at room temperature and adding the Phenonip while mixing. The colorants in the form of pigments are then added followed by the slow addition of the Carboxymethyl 2-Hydroxypropyl Ether (CMHPG) so as to avoid clumping. The mixture is then heated with agitation to temperatures in the range of 1110° F. to 120° F. until solution is achieved. In step2, another premix is prepared with the remaining 5% of the required deionized water, by adding the water to a container with the disodium tetraborate and the mixture heated to temperatures of from 160° F. to 180° F. while mixing to achieve solution. Upon complete solution of the borax crosslinking agent, it is then slowly added to the first guar gum premix in the main turbine mixing tank. Mixing of the resulting solution then takes place until formulation reaches viscosities in the range of from about 750 to 1200 centipoints thereby resulting in the formation of a uniform, hydroscopic, viscous gel of high flow rheology.

TABLE III

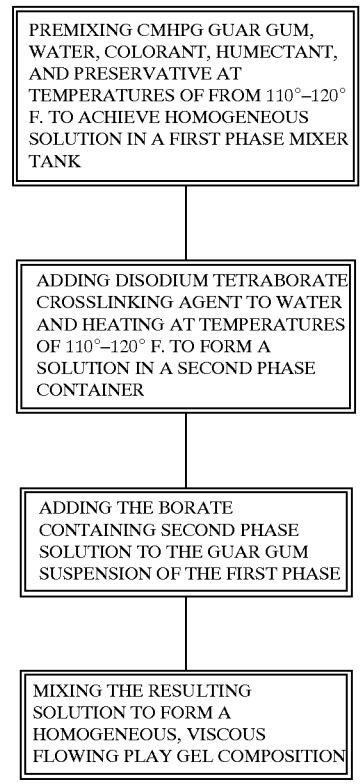

The resulting mixture completes the preparation of the instant play gel in which the guar gum binder and the borate ions provide a firm interlinked matrix to encapsulate the full volume of water thereby forming a cohesive gel which enables a high flow rheology and unusual tactile feel and texture.

It is to be understood that variations of the respective percentages of components set forth in Table II as being "preferred" may be undertaken without departing from the spirit and scope of the present invention. The important aspect of the invention is the use of minor amounts of (i) guar gums selected from the group of hydroxypropyl guar (HPG), carboxymethyl guar (CMG) and carboxymethyl hydroxypropyl guar (Carboxymethyl 2-Hydroxypropyl Ether) (CMHPG) and (ii) crosslinking agents in combination with much larger amounts of water to obtain a sticky gel having cohesiveness and integrity which enables a flow rheology, stretchabilty, and unique tactile feel and texture characteristics. The resulting play gel material may be utilized in accordance with a variety of play patterns and applications involving children or adults. For example, the instant play gel may be utilized in hand molding or manipulation in which substantial enjoyment and amusement is provided in the handling of the play gel material.

While particular embodiments of the invention have been shown and described, it will be obvious to those skilled in the art that other changes and modifications may be made without departing from the spirit and scope of the invention.

That which is claimed is:

1. A pliable play gel comprising a malleable amorphous binder selected from the group of guar gums consisting essentially of hydroxypropyl guar (HPG), carboxymethyl guar (CMG) and carboxymethyl hydroxypropyl guar (Carboxymethyl 2-Hydroxypropyl Ether) (CMHPG) present in an amount of from about 0.5 to 2.0 percent by weight, a guar gum crosslinking agent, and water said gel being characterized by a flow rheology and a pleasurable tactile feel texture.

2. The pliable play gel of claim 1 wherein the crosslinking agent is a borate salt selected from the group consisting essentially of sodium borate, sodium tetraborate, disodium tetraborate, potassium borate, potassium tetraborate, or combinations thereof.

3. The pliable play gel of claim 2 wherein the borate crosslinking agent is present in an amount of from about 0.1 to 1.0 weight percent of the total combined weight of the play gel composition.

4. The pliable play gel of claim 1 further comprising a plasticizer selected from the group of polyols consisting essentially of glycerine, glycerol, polyglycol, and polypropylene glycol.

5. The pliable play gel of claim 1 wherein the binder further includes hydroxy methyl cellulose, hydroxy propyl cellulose, hydroxy propyl-methyl cellulose, and hydroxy benzyl cellulose.

6. The pliable play gel of claim 1 having a pH of from about 6 to 8.7.

7. The pliable play gel of claim 1 having a specific gravity of from about 1.10 to 1.30.

8. The pliable play gel of claim 1 wherein the crosslinking agent is a zirconium compound selected from the group consisting essentially of zirconium lactate, potassium zirconium carbonate, and (2-)bis[carbonate(2-)-O] dihydroxydiammonium zirconate.

9. A pliable play gel comprising the following materials expressed as percent by weight of the total composition:

| Ingredient | Percent by Weight |
| --- | --- |
| Water | 90.00–98.00 |
| Cross-Linking Agent | 0.10–1.00 |

-continued

| Ingredient | Percent by Weight |
| --- | --- |
| Colorant | 0.0005–1.00 |
| Preservative (minerai oil) | 0.10–1.00 |
| Carboxymethyl hydroxypropyl guar | 0.5–2.00 |
| Fragrance | As needed |
| Plasticizer/Humectant | As needed. |

10. The pliable play gel to claim 9 having a specific gravity of from about 1.10 to 1.30.

11. A process for preparing a pliable, cohesive, free flowing gel comprising:

a) mixing a guar gum polymer selected from the group of guar gums comprising hydroxypropyl guar (HPG), carboxymethyl guar (CMG) and carboxymethyl hydroxypropyl guar (Carboxymethyl 2-Hydroxypropyl Ether) (CMHPG) in amounts of from about 0.5 wt. % to 2.0 wt. % of the total anticipated composition of the free flowing gel and water at an elevated temperature, to form a solution;

b) adding a cross-linking agent to the solution in amounts of from about 0.1 wt. % to 1.0 wt. % of the total anticipated composition of the free flowing gel to form a gel suspension; and c) mixing the entire suspension to attain viscosities of from about 750 to 1200 centipoints thereby resulting in the formation of a uniform, viscous gel of high flow rheology.

12. The process of claim 11 wherein the pH of the suspension is maintained from about 6.0 to 8.7 during the gel formation step.

13. The process of claim 11 wherein the crosslinking agent is a borate salt selected from the group consisting essentially of sodium borate, sodium tetraborate, disodium tetraborate, potassium borate, potassium tetraborate, or combinations thereof and is added in a heated premix to the guar gum suspension.

14. The process of claim 13 wherein the guar gum binder is carboxymethyl hydroxypropyl guar (CMHPG) and the borate compound is disodium tetraborate.

15. The process of claim 14 wherein plasticizers selected from the group of polyols consisting essentially of glycerine, glycerol, and/or polypropylene glycol are added prior to the final gel formation mixing step.

16. The process of claim 11 wherein a binder additive compound selected from the group consisting essentially of hydroxy methyl cellulose, hydroxy propyl cellulose, hydroxy propyl-methyl cellulose, and hydroxy benzyl cellulose is added to the initial guar gum solution.

17. The process of claim 11 wherein the added crosslinking agent is a zirconium compound selected from the group consisting essentially of zirconium lactate, potassium zirconium carbonate, and (2-)bis[carbonate(2-)-O]dihydroxydiammonium zirconate.

* * * * *